April 3, 1934.  R. M. RUSSELL  1,953,266
FLOUR SIFTER
Filed June 1, 1932
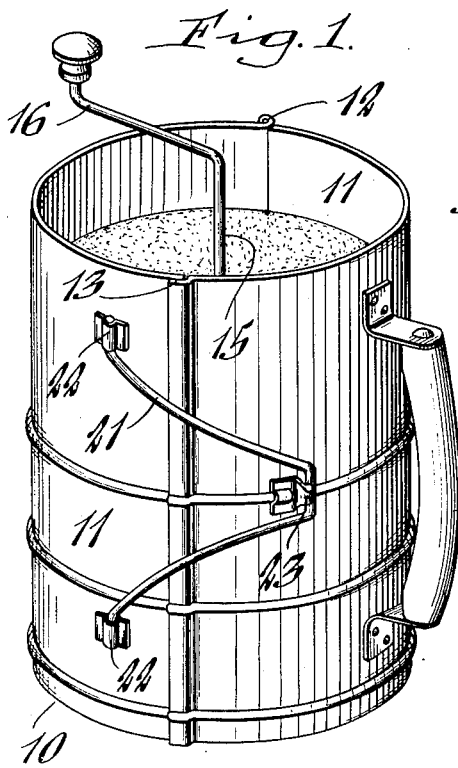
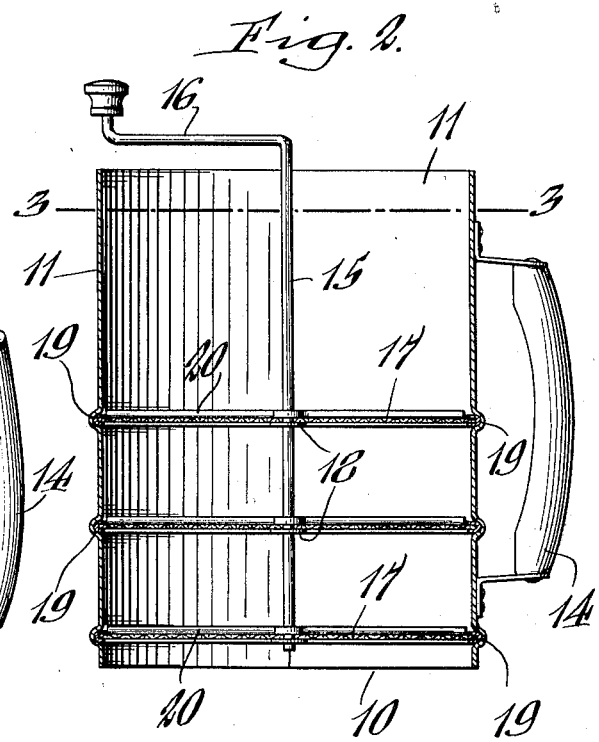
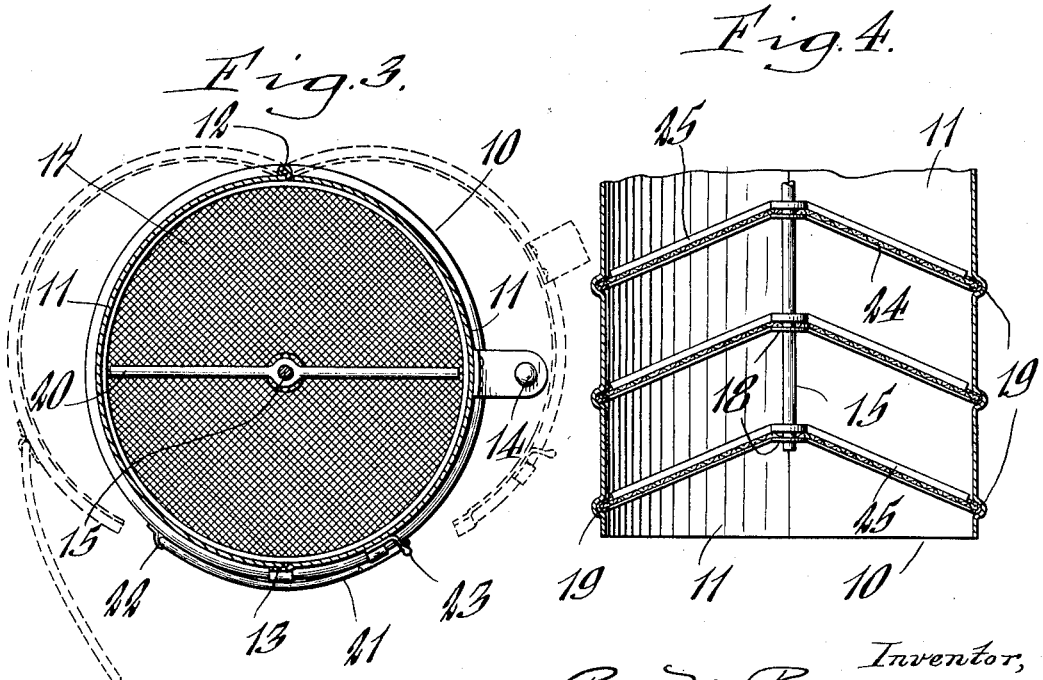

Patented Apr. 3, 1934

1,953,266

UNITED STATES PATENT OFFICE 1,953,266

FLOUR SIFTER

Roy M. Russell, Warsaw, N. Y.

Application June 1, 1932, Serial No. 614,655

1 Claim. (Cl. 209—355)

This invention relates to certain new and useful improvements in flour sifters.

One of its objects is the provision of a flour sifter for domestic use which is designed and constructed to render the task of flour sifting easy and simple and at the same time assure the thorough sifting of the flour to obtain the best results in baking.

Another object of the invention is the provision of a sifter of this character which is simple and inexpensive in construction, which is easy to clean, and which in one operation effects a plurality of siftings of the flour.

In the accompanying drawing:—Figure 1 is a perspective view of a flour sifter embodying my invention. Figure 2 is a longitudinal section thereof. Figure 3 is a cross section taken on line 3—3, Figure 2. Figure 4 is a fragmentary longitudinal section showing a slightly modified form of the invention.

Similiar characters of reference indicate corresponding parts throughout the several views.

By way of example, I have shown my improved sifter as designed for general household use, the numeral 10 indicating the shell or container which may be of cylindrical shape and which is split lengthwise thereof to permit its expansion for effecting the insertion and removal of the sifter unit, as will be hereinafter described. If desired, the shell may consist of two sections 11, 11 hinged along one edge at 12 and meeting at their diametrically opposite edges in an overlapping or like leak-proof joint 13. Instead of using a hinge to permit the expansion and contraction of the shell, the hinge may be omitted and the shell merely split at one side, depending on the resilience of the metal container to effect the desired hingelike action for its expansion. At one side, the container has a suitable handle 14.

Removably fitted within the shell or container 10, is the sifting unit which preferably consists of an operating rod 15 terminating at its upper end in a crank arm or handle 16 and provided adjacent its lower end with a plurality of axially-spaced sieves or screens 17. These sieves are loosely mounted on the operating rod to enable the latter to turn relatively thereto and may be supported in properly spaced relation on the rod by washers or collars 18. For the purpose of holding the sieves in fixed relation within the container relative to the operating rod 15, I provide the interior of the container with supporting means which may consist of annular grooves or recesses 19 in which the peripheral edges of the sieves are adapted to interlock in the assembled position of the parts, as shown in Figure 2. Fixed on the operating rod immediately over the sieves 17 are agitator blades 20 which ride over the sieve when the operating rod is turned to effectually sift the flour.

In order to clamp the expansible shell in its closed or contracted position about the sieves 17 of the sifting unit, I provide a suitable clamping device which may consist of a yoke 21 pivoted at 22 to one side of the joint 13 of the container while its opposite or looped end is adapted to engage a companion latch element 23 secured to the container at the opposite side of its joint. In removing the sifting unit from the shell 10, the clamping yoke is released by swinging it outwardly, after which the shell is expanded, as seen by dotted lines in Figure 3, to effect the release of the sieves 17 from their receiving-grooves 19. When thus removed, the parts can be easily and thoroughly cleaned. In assembling the sifting unit within the shell or container, the sifting unit is inserted within the shell with its sieves in line with the interlocking grooves 19, after which the sides of the shell are drawn together and the clamping yoke 21 fastened in place, as seen by full lines in Figure 3.

In the modified form of the invention shown in Figure 4, the sieves 24 are substantially conical in shape and slope downwardly from the operating rod 15. The agitator blades 25 are likewise inclined to follow the contour of the conical sieve.

While manifestly simple, compact and inexpensive in construction, this improved flour sifter permits the effective and thorough sifting of the flour in one operation, affording the task of baking an easy and simple one and effecting a saving of time and labor on the part of the cook or housewife. Furthermore, its parts may be readily dismembered when necessary for cleaning or repairing or for the insertion of new sieves.

I claim as my invention:—

A sifter of the character described, comprising an expansible, longitudinally-split container having annular screen-supporting means around its interior spaced longitudinally thereof, means for clamping the container along its split edges, and a sifting unit detachably mounted in said container and including a rotatable operating rod adapted for disposition axially of the container and having a series of longitudinally spaced screens thereon engageable at their peripheral edges with said container supporting means, said rod having blades fixed thereon rotatable relatively to the screens over the top side thereof and having means thereon bearing against the bottom side of the screens at the center thereof whereby vertical displacement of the operating rod is prevented.

ROY M. RUSSELL.